United States Patent [19]
Torii

[11] 3,941,218
[45] Mar. 2, 1976

[54] BRAKE APPARATUS AND PLURAL AND INDEPENDENT ACTUATORS THEREFOR

[75] Inventor: Tatsumi Torii, Kariya, Japan

[73] Assignee: Aisin Seiki Kabushiki Kaisha, Kariya, Japan

[22] Filed: July 23, 1970

[21] Appl. No.: 64,048

Related U.S. Application Data

[63] Continuation of Ser. No. 774,137, Nov. 7, 1968, abandoned.

[30] Foreign Application Priority Data
Nov. 14, 1967  Japan................................ 42-73260

[52] U.S. Cl.............. 188/106 F; 188/326; 188/331
[51] Int. Cl.² F16D 51/22; F16D 51/24; F16D 65/14
[58] Field of Search..... 188/326, 331, 106 F, 106 A

[56] References Cited
UNITED STATES PATENTS 2,219,764   10/1940   Chaminade..................... 188/326 X
2,372,319   3/1945   Francois..................... 188/106 A X

*Primary Examiner*—George E. A. Halvosa
*Attorney, Agent, or Firm*—Wenderoth, Lind & Ponack

[57] ABSTRACT

A brake apparatus for motor vehicles consisting of a brake drum and a pair of brake shoes expandable to be moved into frictional engagement with said drum, and a service brake mechanism comprising a wheel cylinder enclosing at least one piston and arranged between the upper end of said brake shoes. A parking or mechanical brake mechanism comprising a lever and link mechanism is arranged between the lower ends of said brake shoes. Said mechanical brake mechanism is connected with said service brake mechanism preferably by means of a linkage in such a manner that the service brake mechanism and the parking brake mechanism may be independently actuated as well as simultaneously actuated.

11 Claims, 5 Drawing Figures

BRAKE APPARATUS AND PLURAL AND INDEPENDENT ACTUATORS THEREFOR

This is, a continuation of application Ser. No. 774,137, filed Nov. 7, 1968, now abandoned.

With respect to a brake apparatus for power vehicles, it is usually so designed that the brake for the rear wheels operates with greater torque than that of the brake for the front wheels, taking into consideration the difference of load distribution and kinetic load transfer between the rear and front wheels. On the other hand, with respect to the parking brake or hand brake, in which the brake shoes for the rear wheel brake are mainly employed, it is preferred that stronger braking effect is obtained by smaller hand pressure. This is apparently a contradiction in operation. The present invention is adapred to fulfill such contradictory operation.

The principal object of the present invention is to provide an improved brake apparatus, wherein the parking or mechanical brake affords stronger action than the service braking action.

Another object of the invention is to provide and improved brake apparatus, wherein the service brake and the parking brake may be simultaneously actuated or may be independently actuated without interferring with one another.

Still another object of this invention is to provide an improved brake apparatus, wherein the parking or mechanical brake effect is greater than the service brake effect when the input power for actuation of both brake mechanisms are equal.

A further object of this invention is to provide an improved brake apparatus, wherein the parking brake may be utilized as the most effective emergency brake.

These and other objects will appear from the subjoined detail description of one embodiment and various modifications of this invention illustrated in the accompanying drawings, in which.

Figure 1:
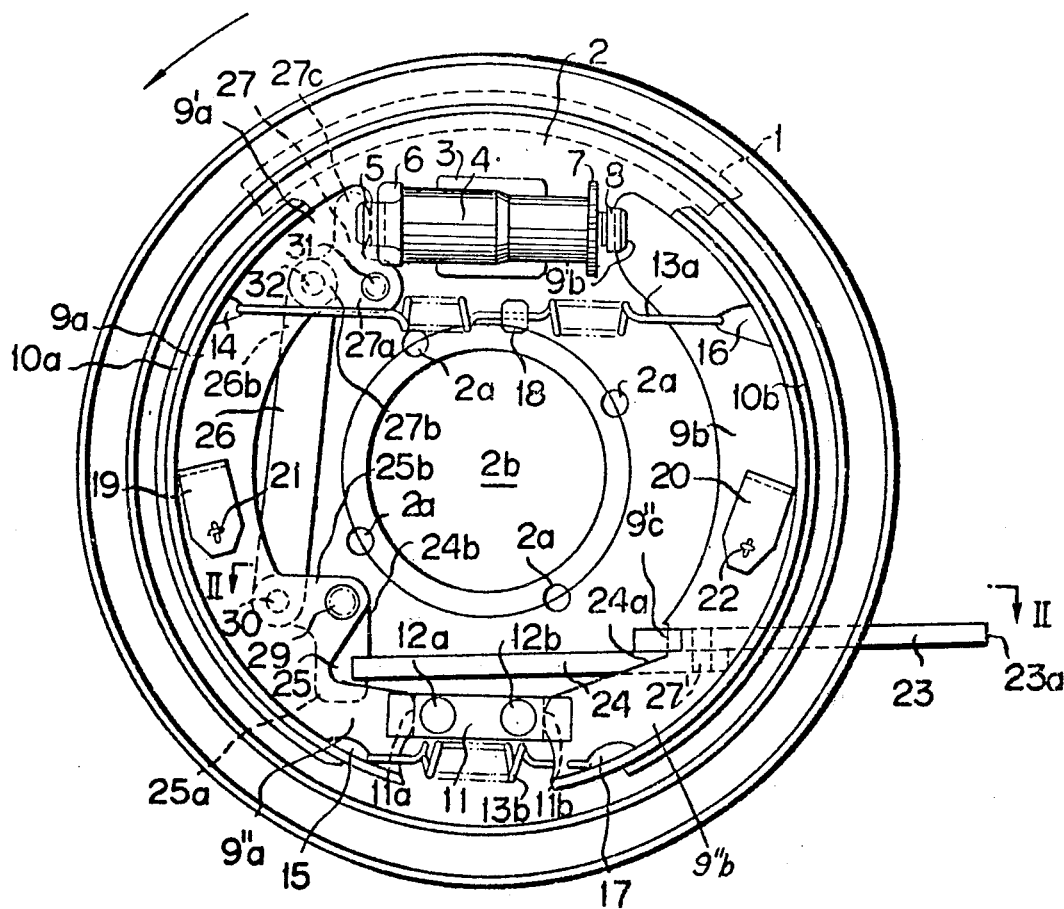
FIG. 1 is a front view of the brake apparatus forming an embodiment of the brake apparatus according to the present invention.

Referring to the drawing, FIG. 1, a brake drum 1 shown in broken line is rotatable in unison with a wheel. 2 is a backing plate having four holes 2a and fixedly mounted on an axle bearing (not shown) which is passed through a central bore 2b. A wheel cylinder assembly 3 is slidably mounted on the backing plate 2. 4 is a wheel cylinder proper enclosing therein a reciprocatable oil cylinder piston 5. 6 is a dust keeper made of rubber and fixed to the lefthand end of said cylinder proper 4. At the right hand end of the cylinder 4, there is mounted a usual means for adjusting the clearance between the brake drum and brake shoes 9a and 9b, said adjusting means comprising and adjusting wheel 7 and an adjusting bolt 8.

The crescent shaped brake shoes 9a and 9b have linnings 10a and 10b, respectively, which are to be moved into frictional contact with the brake drum 1. The upper end 9'a of the brake shoe 9a is in engagement with a U-shaped slot at the lefthand end of said piston 5, and the lower end 9''a thereof is rockably and vertically slidably connected to the lefthand end of an anchor 11, which is fixed to the backing plate 2 by means of pins 12a and 12b. The upper end 9'b of said brake shoe 9b is in engagement with a U-shaped slot at the righthand end of the adjusting bolt 8, and the lower end 9''b thereof is connected to the righthand end of said anchor 11 in the similar manner of connection at the lefthand end thereof with respect to the lower end of the brake shoe 9a. The upper and lower ends of the brake shoes 9a and 9b are connected by means of return springs 13a and 13b respectively. The opposite ends of said return springs are retained by recessed portions 14–16 and 15–17 respectively. 19 and 20 are U-shaped leaf springs for preventing axial frontward movement of the brake shoes 9a and 9b, and are held by pins 21 and 22 projected from the backing plate 2.

Figure 2:
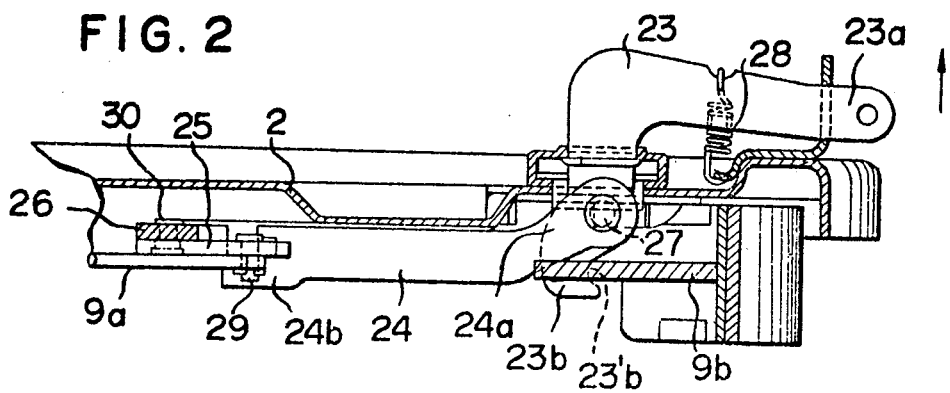
FIG. 2 is a detail of the mechanism for mechanical brake, partly in section taken along line II—II of FIG. 1.

A link mechanism for operating the parking brake comprises levers 23, 24, 25, a link 26 and a lever 27. The actuating lever 23 is L-shaped as shown in FIG. 2, and is pivotally connected with the righthand end 24a of the lever 24, and the righthand end 23a of the lever 23 is connected to a hand operating means, while the lefthand end 23b is provided with a recess 23'b which is in engagement with a recess 9''c formed at the lower end 9''b of the shoe 9b. The hand lever 23 is normally biased by a spring 28 which connects the lever 23 and the backing plate 2. The second lever 25 is also L-shaped, and the mid point thereof is pivotably connected with the lower end 9''a of the shoe 9a as at 29. The lower end 25a of said lever 25 is in engagement with the U-shaped recess of the lefthand end 24b, and the upper arm 25b is pivotably connected by means of a pin 30 with the lower end of a link 26. The righthand arm 27a of the inverted T-shaped lever 27 is pivotably connected with the upper end of the shoe 9a by mans of a pin 31. The lefthand arm 27b is pivotably connected with the upper end 26b of said link 26. The upper end 27c of said lever 27 is abutting against the lefthand end of the wheel cylinder piston 5.

The operation of the above-mentioned first embodiment of the present invention is described as follows: During service braking, pressure oil is supplied into the wheel cylinder 4 from the master cylinder (not shown) according to actuation of the brake pedal (not shown), whereby the piston 5 is actuated to be pushed leftwardly, bringing the brake shoe 9a into frictional contact with the brake drum 1. The wheel cylinder 4 will slide toward the right, moving the brake shoe 9b rightwardly through the adjusting wheel 7 and the adjusting bolt 8, whereby the shoe 9b will be brought into frictional contact with the brake drum 1, whereby effecting the braking effect. Since the lower ends 9''a and 9''b of said brake shoes 9a and 9b are in engagement with the recesses 11a and 11b respectively, it will be seen that, at the service braking, the upper ends 9'a and 9'b of said brake shoes are expanded outwardly to each other, and consequently the brake apparatus serves in the manner of so-called leading trailing brake system. Now, during parking braking, the driver shall manipulate the side brake lever at the driver's seat (not shown). The righthand end 23a is pulled in the direction of the arrow in FIG. 2. By such manipulation, the lower end 9''b of the brake shoe 9b will be pushed rightwardly and, at the same time, the lever 24 will be pushed leftwardly, so that the L-shaped lever 25 will be turned clockwisely around the pin 29, whereby the lower end 9″a of the brake shoe 9a will be pushed leftwardly. The link 26 will be lifted, thereby the lefthand arm 27b of the inverted T-shaped lever 27 will be raised. As the righthand arm of said lever 27 is prevented from vertical movement by the pin 31, the upper arm 27c thereof will push the upper end 9′b of the brake shoe 9b rightwardly through the wheel cylinder 4 and, at the same time, the lever 27 will push the upper end 9′a of the brake shoe 9a leftwardly. From the foregoing, it will be seen that by the manipulation of the actuating lever 23 the upper and lower ends of both the brake shoes 9a and 9b will be expanded, thereby attaining the efficient parking brake action. At this time, as the wheel cylinder assembly 3 is slidably relative to the backing plate 2, it will serve as a floating anchor and, when the brake drum 1 is rotating in clockwise direction, said wheel cylinder assembly 3 will slide rightwardly, and vice versa. In either case, the brake shoes 9a and 9b will be brought into frictional contact with the brake drum, whereby producing self-energy for either direction of rotation of the brake drum and the brake apparatus will serve in the manner of so-called duo-servo type brake system.

The parking brake may be actuated while the service brake is in operation. In case the parking brake action is stronger than the service brake action, the resulting brake effect will be similar to that obtained by applying the parking brake only, and the apparatus operates in the manner of duo-servo type brake system. Assuming that the service brake action is stronger than the parking brake action, the operation of the link mechanism of the parking brake will be as follows: Under the service brake condition, the brake shoes 9a and 9b are in engagement with the brake drum 1. On the other hand, if the lever 23 is pulled the lefthand recess 23′b will abut against the brake shoe 9b, transmitting the turning motion thereto, and the lever 24 is pushed leftwardly thereby pushing the lower end 9″a of the brake shoe 9a leftwardly and, at the same time, the L-shaped lever 25 will be turned around the pin 29, thereby the link 26 will be lifted. The inverted T-shaped lever 27 will be turned clockwisely, and the righthand side of the upper arm 27c of said lever 27 will press the wheel cylinder proper 4. Thus, the service brake is applied as well as the parking brake. During the service braking, the apparatus is operated in the manner of leading-trailing type brake system, and when the service brake is released the parking brake is continued in the manner of duo-servo type braking system.

Figure 3:
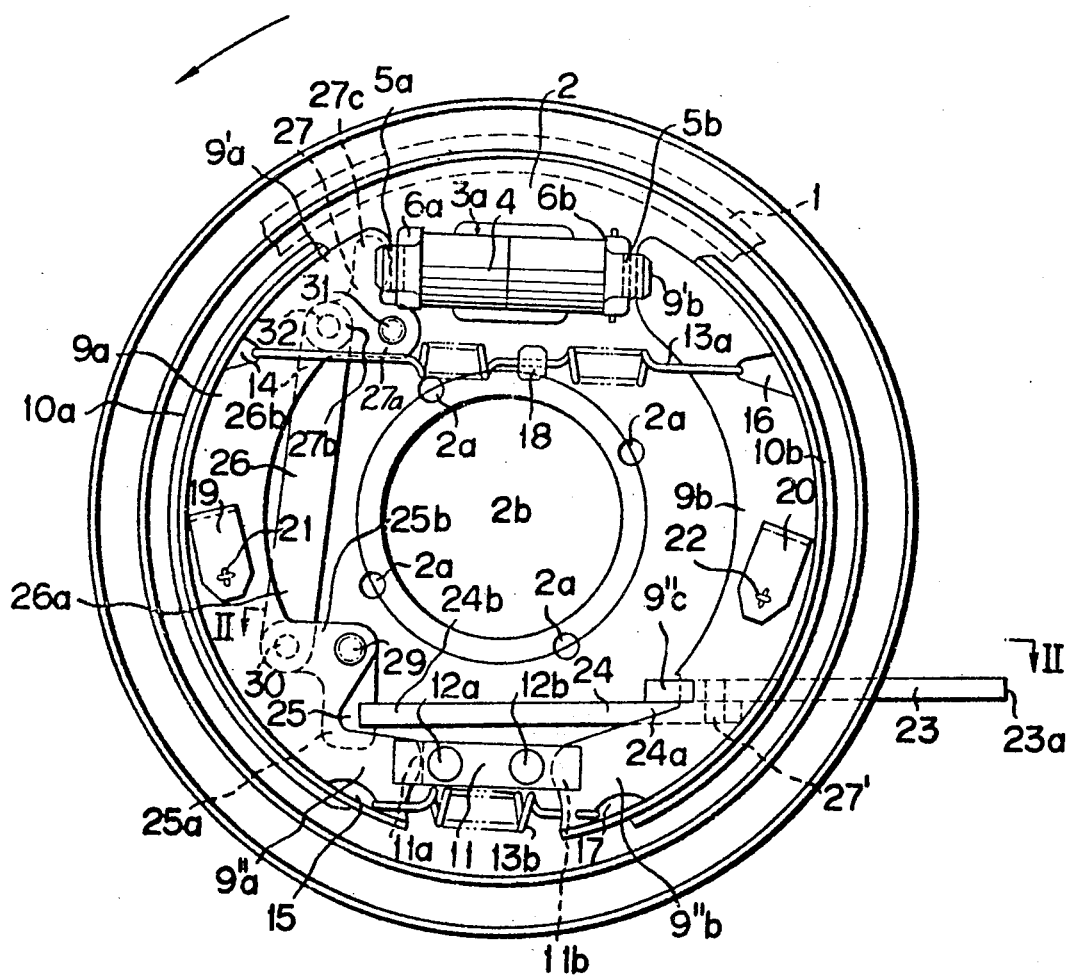
FIG. 3 is a front view showing a modified form of the brake apparatus of this invention.
Figure 4:
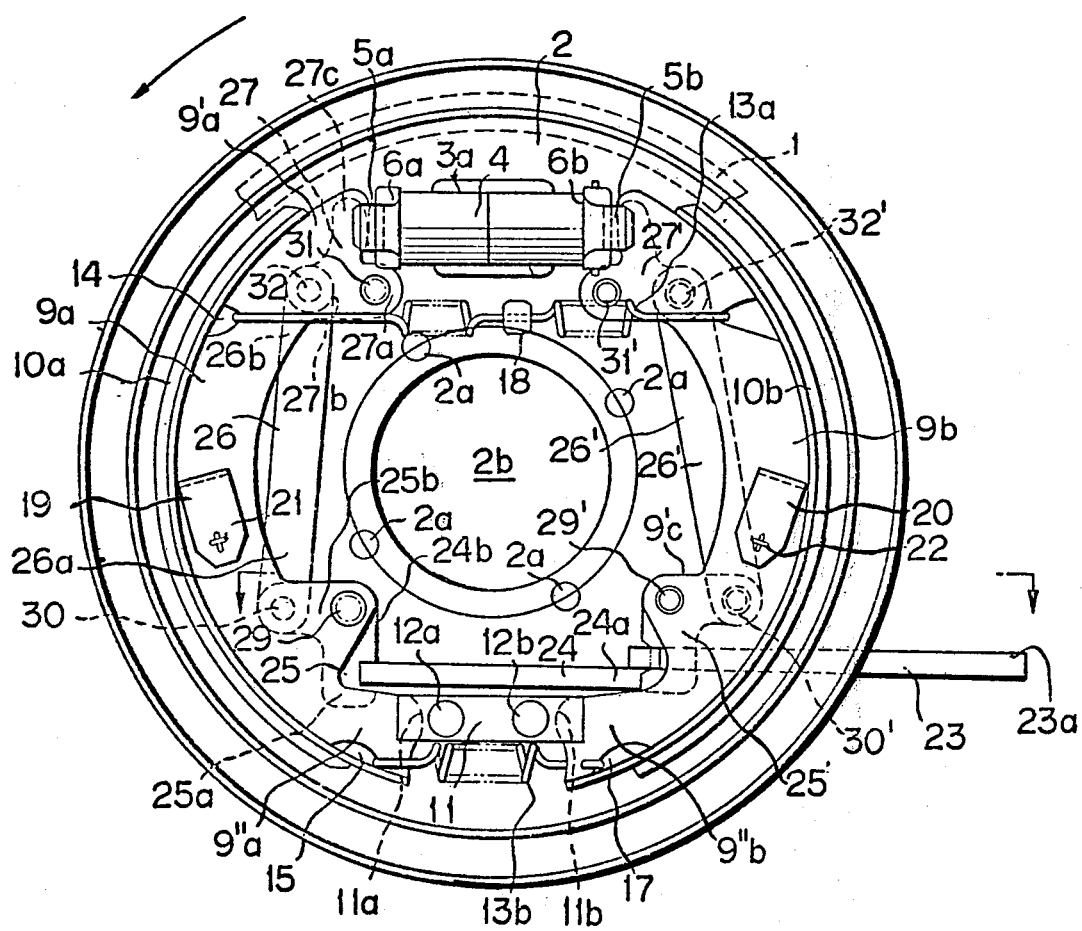
FIG. 4 is a front view showing a second modified form of the brake apparatus of this invention.
Figure 5:
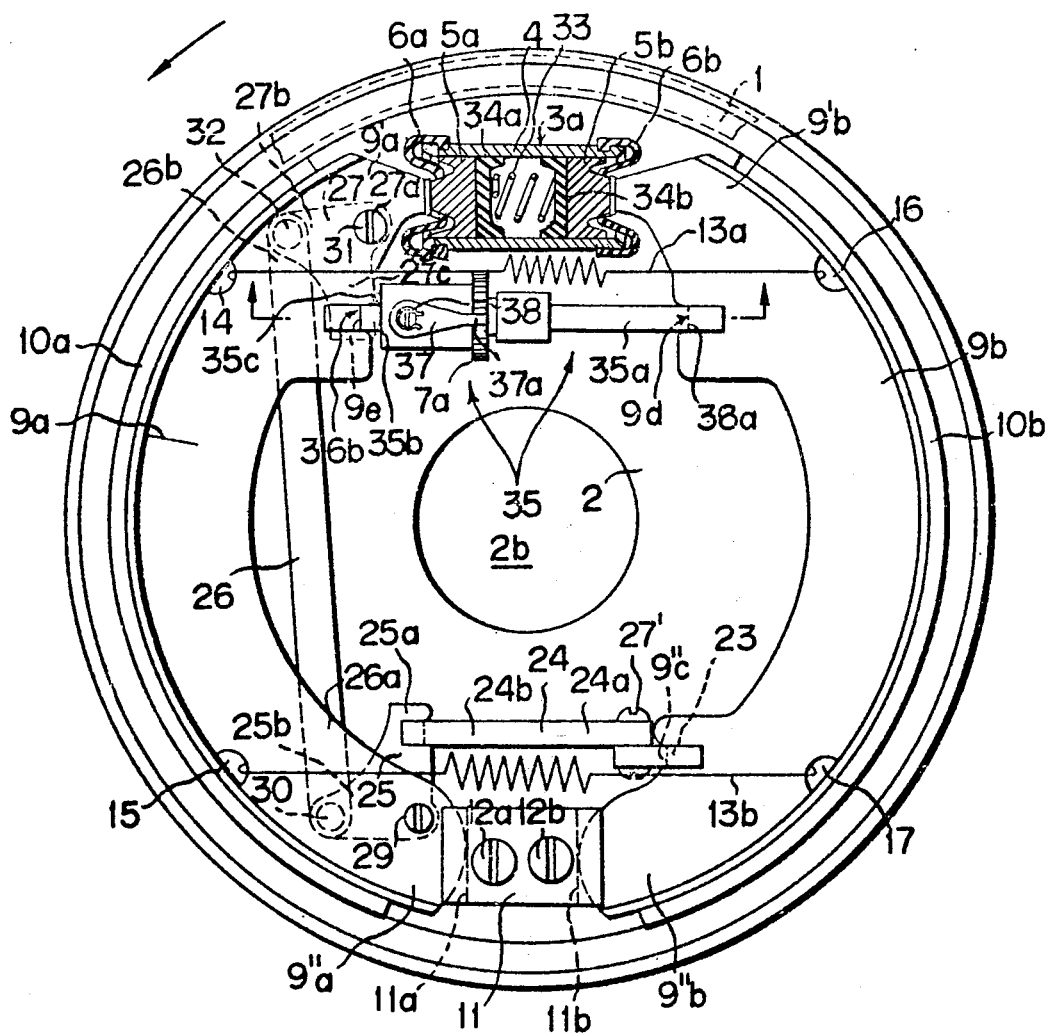
FIG. 5 is a front view showing a third modification of the brake apparatus of this invention.

Now, in the following description referring to FIGS. 3 to 5, showing various modifications of the brake apparatus of this invention, it should be understood that the same reference numerals employed in FIGS. 1 and 2 designate same or identical parts, and that the description in detail for said identical parts is omitted or simplified for the purpose of avoiding any repetition.

Referring to FIG. 3 showing a first modified form of the brake apparatus of this invention, the wheel cylinder assembly 3a is fixedly mounted on the backing plate 2, and the wheel cylinder encloses expandable pistons 5a and 5b. With the arrangements shown in FIGS. 3 and 4, the service brake is operated in the manner of leading-trailing type brake system, and the parking brake is operated in the similar manner when the brake drum 1 is rotated in the clockwise direction and in the manner of double-leading type brake system when the drum is rotated in the counterclockwise direction.

In FIGS. 4 and 5, showing a second and third modifications, the wheel cylinder assembly 3a is fixedly mounted on the backing plate 2, and the wheel cylinder proper 4 expandable pistons 5a and 5b, there being inserted a return spring 33 between the pistons (FIG. 5). In FIG. 5, 34a and 34b are piston caps made of rubber. 35 is a brake clearance adjustor assembly, which acts as a floating anchor arranged in parallel with the wheel cylinder assembly. The righthand end 35a of the adjustor 35 has a U-shaped recess 36a which engages with a recess 9d at the upper end portion of the shoe 9b, and the lefthand end 35b of the adjustor 35 has a U-shaped recess 36b engaging with a recess 9e at the upper end portion 9′a of the shoe 9a. Said adjustor 35 is of substantially similar construction, and the length thereof can be adjusted by rotating a wheel 7a. 37 is a stopper of the wheel 7a, and its one end 37a is engaged by the teeth of the adjusting wheel 7a. The other end is fixed to the adjustor 35 by means of a pin 38. The lower arm 27c of the actuating lever 27 is engaging with the shoulder 35c at the lefthand end 35b of the adjustor 35. During service braking, oil pressure is supplied into the wheel cylinder proper 4 from the master cylinder (not shown), whereby the pistons 5a and 5b will expand against the action of the return spring. The upper ends of the shoes 9a and 9b will be expanded, turning around 11a and 11b, respectively, and come into frictional engagement with the drum 1, thereby acting in the manner of leading-trailing brake system.

During parking braking, by the backward pull of the lever 23 the lower end 9″b of the shoe 9b is pushed rightwardly. The lever 24 will be moved leftwardly by the reaction force, and the lefthand end 24b will push the upper end 25a of the second lever 25a and turn it in the counterclockwise direction, so that the lower end 9″a of the shoe 9a will slide leftwardly. At the same time, the link 26 will be pulled down, and the lever 27 will be turned counterclockwise around the pin 31. The lower end 27c of the lever 27 will push rightwardly the lefthand shoulder of the adjustor 35, so that the upper end portion 9′b of the shoe 9b will be moved rightwardly, and by the reaction thereof the upper end 9′a of the shoe 9a is moved to the left, thereby applying braking effect in the manner of duo-servo type brake system. When the clearance between the drum 1 and the shoes 9a, 9b has increased beyond the predetermined value, this may be adjusted by manually rotating the adjusting wheel 7a against the resilient member to increase the length of the adjustor for setting it for the predetermined brake clearance.

From the foregoing it will be seen, also with respect to said modification, that if the oil pressure supplied into the wheel cylinder 4 is equal with the inlet power applied onto the actuating lever 23, the parking braking action will be greater than the service braking action, and that said service brake and parking brake may be put into operation independently as well as simultaneously. Both brake mechanisms are connected by means of a link mechanism so as to actuate both shoes in similar manner, so that independent actuation of the parking brake mechanism or the service brake mechanism will not interferring with one another.

What is claimed is:

1. A brake apparatus for motor vehicles comprising a rotatable brake drum having a friction surface, a stationary backing plate, a pair of brake shoes mounted on said backing plate and arranged adjacent said friction surface of said brake drum, an actuating means positioned between only a first opposed ends of each of said brake shoes for selectively moving said first ends into contact with said friction surface, and mechanical expanding means for selectively moving the other opposed ends of said brake shoes and said first opposed ends of said brake shoes into contact with said friction surface and maintaining said contact, by all four of said ends of said shoes, said mechanical expanding means comprising a link and toggle means for expanding said other opposed ends and for simultaneously expanding said first opposed ends, the braking caused by said mechanical expanding means being stronger than the braking caused by said actuating means.

2. A brake apparatus as claimed in claim 1, wherein said actuating means is slidably mounted relative to said backing plate and forms part of said link and toggle means.

3. A brake apparatus as claimed in claim 1, wherein said actuating means is mounted on said backing plate and comprises a cylinder enclosing a pair of pistons forming a part of said link and toggle means.

4. A brake apparatus as claimed in claim 1, wherein said link and toggle means includes a floating anchor positioned between said brake shoes in parallel with said actuating means.

5. A brake apparatus as claimed in claim 4, wherein said floating anchor is adapted to regulate the clearance between said brake drum and said brake shoes.

6. A brake apparatus as claimed in claim 1, further comprising a rigid member mounted on said backing plate and having said other opposed ends of said brake shoes rockably and slidably connected thereto for serving as an anchor; and wherein a portion of said link and toggle means is arranged between said first opposed ends of said brake shoes for serving as a floating anchor; the arrangement being such that one of said other opposed ends of said brake shoes acts as an anchor when said mechanical expanding means is actuated.

7. A brake apparatus for motor vehicles as in claim 6, wherein one part of said link and toggle means is arranged in the vicinity of said rigid member and adapted for expanding the opposed ends of the brake shoes on the side of said rigid member, and a second part of said link and toggle means is disposed on the side of said actuating means, the arrangement being such that the input on said link and toggle means adjacent said rigid member is transmitted to an actuating member part of said link and toggle means, so that the opposed ends of said brake shoes beside said rigid member engage with said brake drum, yet the opposed ends of said brake shoes on the side of said actuating means are capable of further expansion.

8. A brake apparatus for motor vehicles as claimed in claim 6, wherein said mechanical expanding means comprises a first actuating lever having an L-shape and which is manually operable at its one end and the other end thereof is in contact with one of said brake shoes, a second actuating lever pivotally mounted at its one end on an intermediate portion of said first lever, and a third actuating lever having an L-shape and connected to the other end of said second lever and pivotally mounted on the other brake shoe at the side of said other opposed ends thereof for transmitting force to expand said first opposed ends of said brake shoes.

9. A brake apparatus as claimed in claim 1, further comprising a rigid member mounted on said backing plate and having said other opposed ends of said brake shoes rockably and slidably connected thereto for serving as an anchor; and wherein said actuating means includes a fixed cylinder enclosing a pair of pistons arranged in a manner to prevent movement of one of said pistons from being transmitted to the other of said pistons; and said link and toggle means includes a pair of force transmitting members operatively connected to said brake shoes, respectively, whereby said first opposed ends of said shoes are moved into contact with said friction surface through said force transmitting members even if said other opposed ends have been moved into contact with said friction surface; the arrangement being such that diagonally positioned two ends of said brake shoes act as anchor means during the braking caused by said mechanical expanding means thereby creating the braking of said mechanical expanding means which is stronger than the braking caused by said actuating means.

10. A brake apparatus for motor vehicles as claimed in claim 9, wherein said force transmitting members are comprised of a pair of link means which are symmetrically disposed on each brake shoe.

11. A brake apparatus for motor vehicles as claimed in claim 9, wherein said mechanical expanding means comprises a first actuating lever having an L-shape and which is manually operable at its one end, a second actuating lever pivotally mounted at its one end on the intermediate portion of said first lever, a pair of third actuating levers pivotally mounted on each of said brake shoes at the side of said second opposed ends thereof and each kept in contact at one end thereof with the other ends of said first and second actuating levers, each other end of said third actuating levers being pivoted to one end of said force transmitting members, and a pair of fourth actuating levers pivotally mounted on each of said brake shoes at the side of said first opposed ends thereof and each kept in contact at one end thereof with the other ends of said force transmitting members, the other end of each fourth actuating lever being kept in contact with said actuating means.

* * * * *